(12) United States Patent  (10) Patent No.: US 7,898,594 B2
Inaba  (45) Date of Patent: Mar. 1, 2011

(54) DIGITAL CAMERA

(76) Inventor: Minoru Inaba, Tochigi-ken (JP)

( * ) Notice: Subject to any disclaimer, the term of this patent is extended or adjusted under 35 U.S.C. 154(b) by 807 days.

(21) Appl. No.: 11/294,175

(22) Filed: Dec. 5, 2005

(65) Prior Publication Data

US 2007/0035656 A1    Feb. 15, 2007

(30) Foreign Application Priority Data

Aug. 11, 2005  (JP) ............................. 2005-233514

(51) Int. Cl.
*H04N 5/225*  (2006.01)
(52) U.S. Cl. ...................................................... 348/373
(58) Field of Classification Search ................. 348/180,
348/187, 373; 359/507–514
See application file for complete search history.

(56) References Cited

U.S. PATENT DOCUMENTS

| | | | | |
|---|---|---|---|---|
| 5,640,207 A * | 6/1997 | Rahmouni et al. | ........... | 348/374 |
| 6,449,004 B1 * | 9/2002 | Okisu et al. | .................... | 348/44 |
| 6,742,943 B2 * | 6/2004 | Ushiro | ........................ | 396/529 |
| 6,910,814 B2 * | 6/2005 | Kawai et al. | ................. | 396/529 |
| 6,963,365 B2 | 11/2005 | Baron | ......................... | 348/239 |
| 6,985,177 B2 * | 1/2006 | Takahashi et al. | ....... | 348/208.99 |
| 7,369,760 B1 * | 5/2008 | Waterford | ..................... | 396/27 |
| 2005/0057822 A1 * | 3/2005 | Hayashi | ...................... | 359/694 |
| 2005/0073602 A1 * | 4/2005 | Kamoda et al. | ............. | 348/335 |

* cited by examiner

*Primary Examiner*—Sinh Tran
*Assistant Examiner*—Akshay Trehan
(74) *Attorney, Agent, or Firm*—Fattibene and Fattibene, LLC; Paul A. Fattibene

(57) ABSTRACT

An image pickup substrate mounted with an image pickup element is pressed against the surface of a camera body frame by a plate spring, and exclusive position adjusting mechanisms that independently move the image pickup substrate to a vertical direction and a lateral direction are provided. The image pickup substrate is provided so that its position can be adjusted and a projected image by means of a photographing lens is imaged on the image pickup element. Vertical lines and lateral lines are displayed as software display on an electronic display, and their positions can be independently adjusted to the lateral direction and the vertical direction. A dustproof plate is fixed between an interchangeable lens section and a camera main body, so as to prevent dust from adhering to the surface of the image pickup element.

5 Claims, 9 Drawing Sheets

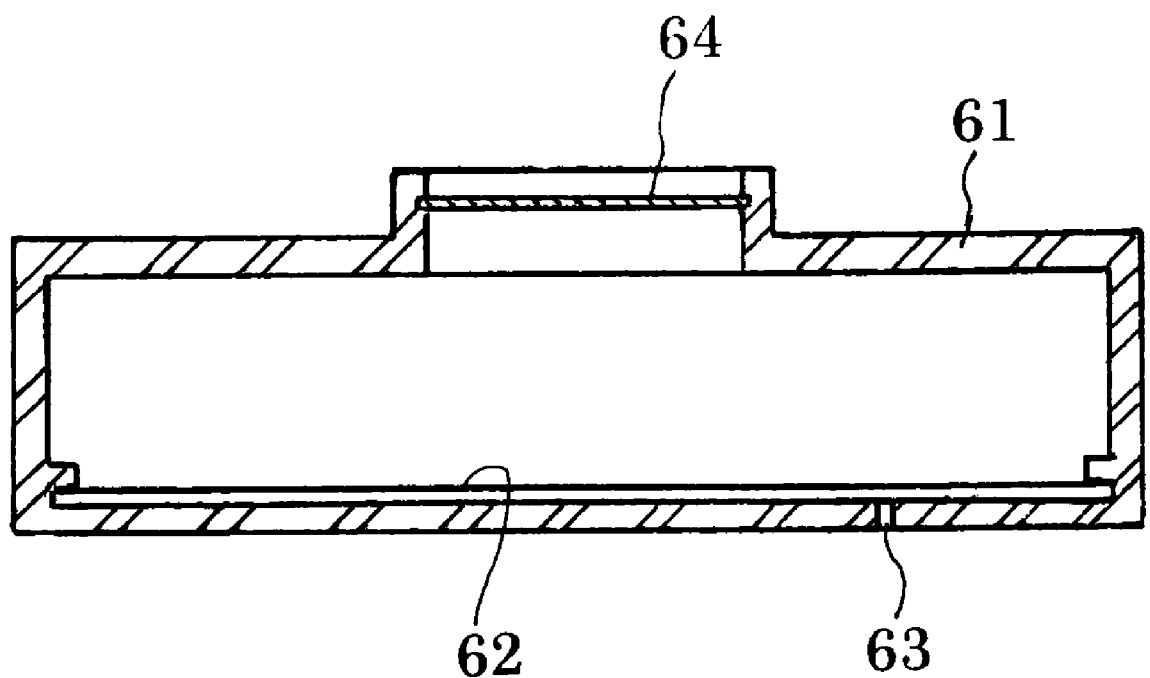
F I G. 6

DIGITAL CAMERA

BACKGROUND OF THE INVENTION

1. Field of the Invention

The present invention relates to a digital camera, and particularly relates to the digital camera having a perspective control function that changes perspective of an image and adjusts visibility on an electronic display so as to photograph the image, and that prevents dust from adhering to an image pickup element.

2. Description of the Related Art

As shown in FIG. 7A, in the case where an entire object 71 such as high building or construction is tried to be photographed by a camera 72, when the camera 72 to be used is normal, an optical axis L of a photographing lens 73 necessarily faces upward. FIG. 7B illustrates the case where relative position relationship between the camera 72 and the object 71 shown in FIG. 7A is constant and the optical axis L of the photographing lens 73 is horizontal. As is clear from FIG. 7B, the image of the object 71 photographed in such a state is seem to tilt backward.

FIG. 8 is an one example which is obtained by schematizing the picture photographed in the state of FIGS. 7A and 7B. For example, in the case where a tower block or the like with constant width which is long in an up-down direction is the object 71, an upper part of the object 71 (far portion) seems to have a narrow width and a lower part (near portion) seems to have a wide width. Further, the entire object 71 seems to tilt backward, and tower blocks on the right and left sides in FIG. 8 seem to tilt inward.

In order to solve a problem of deformation of an object due to the perspective, a digital camera that makes digital correction by means of a processor that stores photographed images in the camera is proposed (for example, see Japanese Patent Application Laid-Open No. 2002-335438 corresponding to U.S. Pat. No. 6,963,365 (Patent Document 1)).

The conventional example disclosed in Patent Document 1, however, has the following problem. That is to say, firstly, an operation of the camera becomes very complicated. Secondary, when perspective is controlled by a post-process, a pulse rate is partially changed, and thus the quality of an image is consequentially deteriorated. Thirdly, since an image to be displayed on a monitor at the time of photographing is an uncorrected image, a finally frame or the like cannot be checked at the time of photographing. Further, a finished state after the post-process cannot be imaged at the time of photographing. If photographing is failed, a correction cannot be mostly made by the post-process. From these points, it is not preferable that the perspective is electronically controlled in the post-process except that emergency evacuation (a failed picture is saved).

The perspective control may be made, as shown in FIG. 9, by making a surface of a film (image pickup element) 92 parallel with a surface of the object 71, and moving an optical axis L of a photographing lens 93 to a vertical direction within a range that the object is imaged satisfactorily in an image frame of the film 92 so as to adjusting a position. This perspective control is already made in view cameras or the like, and this is described in [0003] to [0004] of Patent Document 1.

In the case of modernized rigid cameras, however, the perspective control becomes gradually difficult and thus is actually omitted. For example, in range finder type cameras, the perspective control becomes difficult and then disabled. The perspective control is revived in single lens reflex cameras, but since special lenses should be used, they become very expensive and are not practical (see [0003] of Patent Document 1).

Meanwhile, lens interchangeable type digital cameras come onto the market. The biggest problem of the lens interchangeable (attachment/detachment) type digital cameras is that dust adheres to image pickup elements, but some of such cameras on the market have a constitution such that lowpass filter etc. provided just in front of the image pickup element is ultrasonically vibrated by crystal resonator so that the dust adhering to the filter is shaken off, and the dust is collected using pressure sensitive adhesive so that re-flying of the dust is prevented. Further, digital cameras provided with wiper for wiping the image pickup elements come onto some markets. These cameras, however, do not have the complete dust-proof function.

Lenses for the perspective control in single-lens reflex cameras are very expensive, and their position can be adjust positions only to a single direction due to their constitution. If, however, the state shown in FIG. 7A is a plan view, the position adjustment is necessary also for a horizontal direction (right-left direction). In many photographing cases, the positions should be actually adjusted to both directions: an up-down, namely, vertical direction (longitudinal direction) and a right-left, namely, horizontal direction (lateral direction) which is perpendicular to the vertical direction. In the case of the single-lens reflex cameras, since the position can be adjusted only to a single direction, a vicinity of a mounting base portion of the lens can be rotated. In actual photographing, therefore, it is not easy to determine the final position.

In order to realize the state shown in FIG. 9, the optical axis of the lens may be constituted so as to be capable of moving relatively with respect to the film or a center of the image pickup element. It is, therefore, easier that the optical axis of the lens is fixed to the camera, and the film or the image pickup element is moved. In the case of the single-lens reflex cameras, however, it is necessary that a position relationship between a photographing screen of the film or the image pickup element and a focusing glass for observing a photographing state is an equivalent position such that they are symmetrical at 90° (occasionally including any angles other than 90°), for example. For this reason, it is actually impossible that the film or the image pickup element is moved in order to make the perspective control.

Recent electronic displays have notably high definition, and optical finders are replaced by electronic view finders for practical use. The electronic finder, therefore, gets free from a constitution that it establishes a constant relationship with an image pickup element in the installation position of camera. For this reason, a photographing lens is fixed and the image pickup element is moved to the vertical direction with respect to the optical axis of the photographing lens, so that the perspective control becomes practical.

With particularly ferroelectric liquid crystal which is developed recently, a circuit is formed directly on silicon, pixel pitch of 10μ and resolution of 2500 dip are realized, and an aperture ratio is high so that meshes between pixels are hardly sensed. Further, since responsibility is very high (100 to 10 μsec which is about 1000 times as high as that of conventional liquid crystal displays), time-division display (high-frequency time division does not cause color burst in motion picture images) is enabled, and these characteristics are synthesized so that micromini size and high definition are realized. Since the ferroelectric micro-displays have very small screen size, the displays cannot be directly viewed, and thus they are enlarged to be viewed by an ocular magnifying glass.

The digital cameras having the perspective control function, however, cause a difficult problem at the stages of design and manufacturing. This is because, in order to move an image pickup element at a constant posture, a guide way is normally necessary, and in this case, even very small guide ways require expense and man-hour.

When an image pickup element is actually tried to be constituted so as to be capable of moving and adjusting individually to both lengthwise and lateral directions, two-tiered guide ways are necessary in a direction perpendicular to the longitudinal and lateral directions. Further, it is necessary to mount an image pickup element onto a double slide included in a camera main body having a sealed structure, and enable the image pickup element to move and adjust independently to the longitudinal and lateral directions. In this case, it is necessary to set the image pickup element so as not to improperly move due to external shock or the like at the time of photographing, and thus the constitution becomes complicated.

In the conventional cameras, it is already embodied that lattice-shaped lines are printed or carved on a focusing glass and an image is visually checked. In a state where a structural outline is determined at the time of photographing, the lattice-shaped lines do not match with the image in a positional relationship, and thus it is difficult to observe the state of the perspective.

In order to make the perspective control, an image circle of the photographing lens requires margin, but most of the recent single-lens reflex cameras are designed so as to be capable of using interchangeable lenses of conventional silver halide film cameras. Further, most of the single-lens reflex cameras use image pickup elements whose area is smaller than a standard format 24 mm×36 mm of the conventional silver halide films, but it is convenient that the above lenses and the image pickup elements are combined to be used. This is because the image circle of the photographing lens has margin, and the perspective control is enabled in all interchangeable lenses.

Even if the image circle has margin, however, it is very difficult to make the perspective control in the constitution of the conventional single-lens reflex cameras, but single-lens reflex type (lens interchangeable type) digital cameras have another problem. The problem is that dust enters the cameras at the time of attaching/detaching lenses so as to adhere to the image pickup elements.

In order to solve the above problem, cameras in which lowpass filter etc. provided just in front of the image pickup elements are ultrasonically vibrated so that dust is shaken off, and cameras in which dust is wiped by a wiper come onto the market. Although the structures become complicated and their manufacturing cost is high, the actual dust removing effect is not perfect.

SUMMARY OF THE INVENTION

It is an object of the present invention to provide a digital camera that is capable of visually checking and adjusting perspective of an image on an electronic display before photographing, and securely preventing adhesion of dust to a surface of a filter in an inexpensive and simple structure.

The present invention is proposed in order to achieve the above object. The present invention from a first aspect provides a digital camera that visually checks an image to be imaged on an image pickup element on an electronic display and simultaneously controls perspective so as to photograph the image and that is constituted in such a manner that an image pickup substrate mounted with the image pickup element is pressed against a front surface or a rear surface of a body frame of the camera by a pressing member such as a plate spring, and is provided so that its position can be adjusted to a longitudinal direction a lateral direction vertical to an optical axis of the photographing lens, independently, the position of the image pickup substrate is adjusted so that a projected image by means of the photographing lens is imaged on the image pickup element, and thus the perspective can be visually checked and adjusted on the electronic display before photographing.

According to this constitution, when an object such as a tower block is photographed, the position of the image pickup substrate is previously adjusted with respect to a body frame of the camera so that the image to be projected by the photographing lens is imaged on the image pickup element. That is to say, the image pickup substrate is moved to arbitrary positions in the longitudinal direction and the lateral direction so as to be located. The image pickup element mounted to the image pickup substrate is, therefore, adjusted independently to desired positions in the longitudinal and lateral directions which are perpendicular to each other in a direction vertical to the optical axis of the photographing lens. After a photographer, therefore, visually checks and adjusts the perspective of an image on the electronic display in advance, the photographer photographs the object such as a tower block.

The invention from a second aspect provides the digital camera depending from the first aspect that is constituted in such a manner that vertical lines and lateral lines as indicator lines are displayed as software display on the electronic display, the vertical lines and the lateral lines are provided so as to be capable of being moved independently to a lateral direction and a vertical direction of the electronic display, and the vertical lines and the lateral lines are matched with predetermined positions with respect to an image on the electronic display so that the perspective state can be visually checked and adjusted.

According to this constitution, the image of the object captured by the image pickup element is displayed as a finder image on the electronic display, and the vertical line and the lateral line as indicator lines are displayed as software display on the electronic display. The number of the vertical line and the lateral line may be one or plural. The vertical line and the lateral line are individually moved to a lateral direction arbitrary position and a vertical direction arbitrary position over the entire surface of the electronic display so as to be displayed by special display operating sections. As a result, the indicator lines are matched with positions of the finder image, and the perspective of the image is visually checked and adjusted.

The invention from a third aspect provides the digital camera depending from the first or the second aspect that is constituted in such a manner that the digital camera is constituted so that a lens is interchangeable, and a dustproof plate that seals the inside of the camera main body is mounted between the interchangeable lens and the camera main body, so that dust does not adhere to the surface of the image pickup element in the camera main body.

According to this constitution, a dustproof plate such as a glass plate or a resin plate is provided between an interchangeable lens and a camera main body, so that the camera main body is formed so as to have a sealed structure. As a result, at the time of lens interchanging (attachment/detachment), dust is prevented from entering the camera main body. Dust is, therefore, prevented from adhering to the surface of the image pickup element contained in the camera main body.

The invention from a fourth aspect provides the digital camera depending from the first, second or third aspect that is constituted in such a manner that a venthole which is communicatively connected to an outside is formed on a side wall of the camera main body, a flexible partitioning member is provided to an inner portion of the camera main body corresponding to the venthole so that a pressure is different between the inside and the outside of the camera main body, and the pressure difference is mitigated by deflection of the flexible partitioning member.

According to this constitution, when a pressure difference occurs between the inside and the outside of the camera main body, the flexible partitioning member such as a diaphragm, a closed-end cylindrical bellows or a resin film deflects, so that the pressure difference is mitigated as small as possible or eliminated.

In the invention from the first aspect, when the object such as a tower block is photographed, after the perspective of the image is previously observed and adjusted into an optimal state on the electronic display, the object such as tower block can be photographed. For this reason, the digital camera can be provided so as to have a simple structure where deformation of the object is prevented and a satisfactory picture can be obtained securely and easily. Further, this camera does not require a special lens, and is inexpensive and practical. The final position can be easily determined in this camera at the time of actual photographing.

In the invention from the second aspect, the indicator lines are matched with predetermined positions of the finder image on the electronic display, and the perspective is visually checked and adjusted. For this reason, in addition to the effect of the invention from the first aspect, the perspective of the image can be visually checked and adjusted accurately, easily and quickly.

In the invention from the third aspect, dust can be prevented from adhering to the surface of the image pickup element in the camera main body. For this reason, in addition to the effect of the invention from the first or second aspect, improper photographing can be prevented due to the adhesion of dust to the surface of the image pickup element, so that a satisfactory picture can be always obtained stably.

In the invention from the fourth aspect, the pressure difference between the inside and the outside of the camera main body is mitigated by the flexible partitioning member quickly. For this reason, in addition to the effect from the first, second or third aspect, even in the case where the pressure difference between the inside of the camera main body having the sealed structure and atmospheric air is large due to temperature change, altitude change and the other weather conditions, a strong force is not applied to the flexible partitioning member, so that a satisfactory dew condensation preventing effect can be obtained.

BRIEF DESCRIPTION OF THE DRAWINGS

FIG. 6 is a sectional view illustrating a constitutional example where a flexible thin plate is mounted to the camera according to the present invention;

DETAILED DESCRIPTION OF THE PREFERRED EMBODIMENTS

Figure 1:
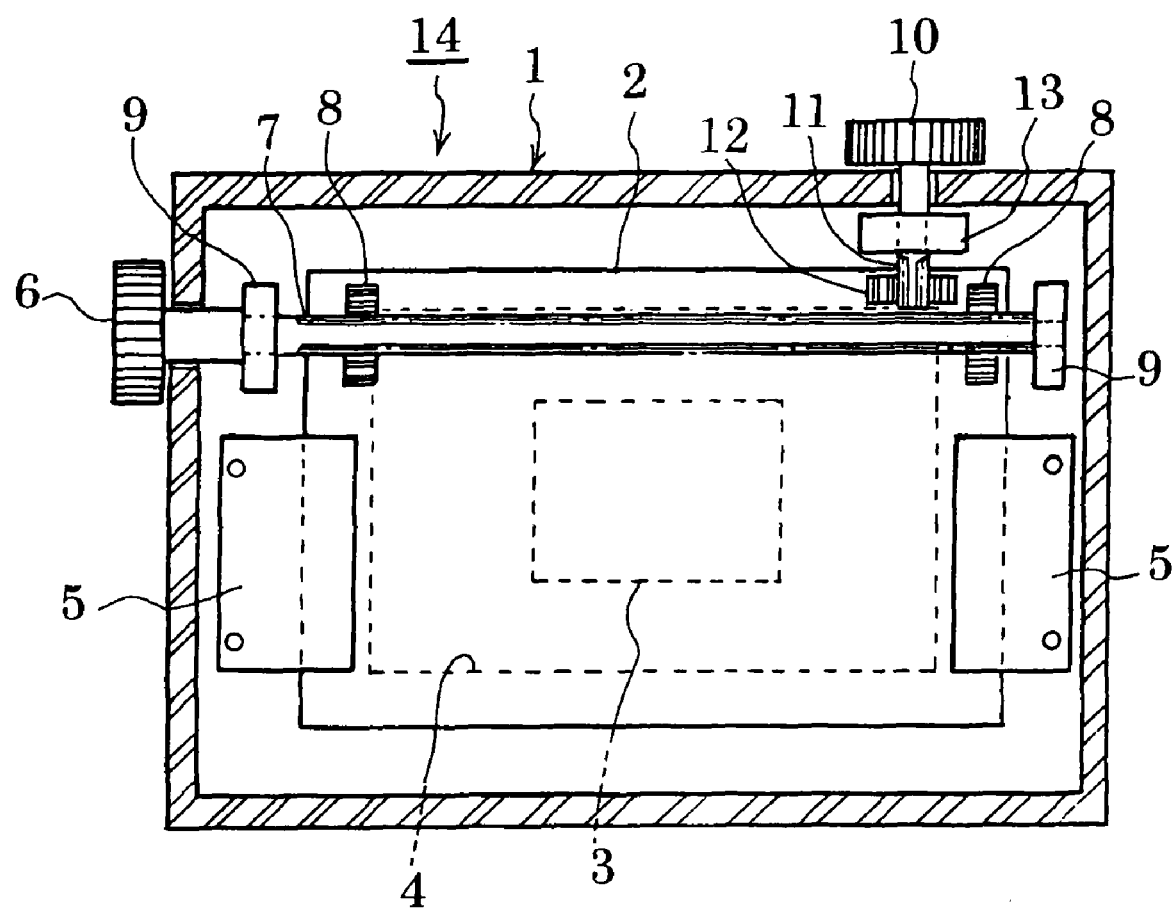
FIG. 1 is a sectional view of a digital camera according to one embodiment of the present invention.

It is an object to provide an inexpensive digital camera having a simple constitution in which before photographing, perspective is being observed and is simultaneously adjusted suitably, and distortion of an image such as high building is prevented so that a satisfactory picture. This object is realized by providing a perspective control mechanism that moves an image pickup element to a direction vertical to an optical axis of a photographing lens and longitudinal and lateral directions which are perpendicular to each other so as to adjust the image pickup element. In the best embodiment of the present invention, the digital camera includes a longitudinal direction position adjusting mechanism and a lateral direction position adjusting mechanism that press to attach an image pickup substrate mounted with the image pickup element to be attached to a front surface or a rear surface of a frame (body frame) in a camera main body using a plate spring or the like and independently move the image pickup substrate to a longitudinal direction and a lateral direction of the image pickup substrate. As a result, the position of the image pickup element can be adjusted so that an image projected by the photographing lens is imaged in a predetermined position on the image pickup element.

The image pickup substrate mounted with the image pickup element is mounted to the frame of the camera main body in a sliding state, and a rack is mounted to both ends of the image pickup substrate. The racks can be driven and adjusted directly by one pinion, and in this case, a posture of the image pickup substrate is restrained and a position of the image pickup substrate in a lengthwise direction of the pinion is fee.

Similarly, a rack and a pinion are provided to one end in a direction perpendicular to the above racks and the pinion, and the position of the image pickup substrate in the direction perpendicular to above-mentioned direction can be adjusted to a free position by these provided rack and pinion. The position of image pickup element mounted to the image pickup substrate is, therefore, adjusted to the perpendicular two directions independently, so that the perspective of the image can be controlled.

A perspective control device maybe mechanistically constituted so as to be capable of moving and adjusting the image pickup element in the above manner, but its adjusting state should be easily and visually checked. In the case where, for example, an object is a building, at a determination whether the perspective is adjusted, all vertical lines of an image should be parallel. Further, all horizontal lines should be parallel depending on photographing scene. Needless to say, since a picture is one kind of expression, the present invention is not always limited to this.

In a conventional single-lens reflex camera, a lattice is printed (carved) on a focusing glass, but since the lattice on the focusing glass is fixed, the lattice does not mostly match with the vertical lines or the horizontal lines of an object image such as building. This makes accurate adjustment difficult.

An image captured by the image pickup element is, therefore, displayed as a finder image on an electronic display, but at this time, one or a plurality of indicator line(s) is (are) displayed as software display in the longitudinal and lateral directions. The indicator lines are moved to be displayed over an entire display surface of the electronic display by an operating member such as an operation key. As a result, the indicator lines are matched with an arbitrary position of the finder image, and the perspective is visually checked to be adjusted to an optimal state.

As one example of a dust intrusion preventing measure, a transparent glass or a resin plate is mounted to the front surface of the camera, so that a sealed structure is obtained. In this case, in order to improve a dew condensation preventing effect, a dry air (nitrogen, argon gas or the like if possible) is injected into a sealed portion, so that an airtight structure is obtained.

Even in the case of the airtight structure, a pressure difference occurs between an inside of the camera and atmospheric air due to temperature change or altitude difference, and thus a strong force is applied a dustproof plate such as a glass plate. Further, even if a O ring is mounted to a portion where the pinion shaft or the like of the perspective control mechanism pierces an outer wall of the camera main body, there is a fear that a movable portion such as the 0 ring cannot tolerate long-term pressure.

In order to solve this problem, the pressure difference inside and outside the camera main body is eliminated. In order to eliminate the pressure difference, a diaphragm, a closed-end cylindrical bellows, or a flexible partition (flexible partitioning member) such as a resin film is provided between a mechanism portion that should maintain airtightness of the camera main body and atmospheric air.

The digital camera having the perspective control mechanism according to a concrete embodiment of the present invention is explained below. This embodiment is the digital camera in which before photographing, an image to be imaged on the image pickup element is being visually checked on the electronic display, and simultaneously the perspective is controlled so that the image is photographed. The image pickup substrate mounted with the image pickup element is pressed to the front surface or the rear surface of the body frame of the camera by the plate spring and is mounted thereto so that an image is imaged on the image pickup element. First racks are fixed to vicinities of both ends of the image pickup substrate in the longitudinal direction, respectively.

Meanwhile, a bearing that supports a first pinion is annexed to body frame portions on both outsides to which the image pickup substrate is mounted, and the first pinion is engaged with the first racks so that the posture of the image pickup substrate is guided. At the same time, the first pinion is constituted so as to be capable of locating the image pickup substrate to a direction tangential with respect to its pitch circle and a direction vertical to the optical axis of the photographing lens. Similarly, a second pinion perpendicular to the first pinion and second rack are provided, and the second pinion is engaged with the second rack only at one end. The image pickup substrate is constituted so as to be capable of being located to a direction perpendicular to the direction adjusted by the first pinion.

A first operation knob (first operation member) annexed to the first pinion and a second operation knob (second operation member) annexed to the second pinion are independently turned, so that the image pickup element mounted to the image pickup substrate is adjusted to arbitrary positions in the perpendicular directions vertical to the optical axis of the photographing lens. A photographer visually checks and adjusts the perspective on the electronic display and then photographs an object.

As the indicator lines on the electronic display, one or a plurality of lines is (are) displayed as software display in the vertical direction and the lateral direction, and the vertical and lateral lines are constituted so as to be capable of being independently moved to be adjusted in the arbitrary positions. Further, in a lens interchangeable digital camera, the dustproof glass or the resin plate is fixed as the dustproof plate to a position just after the interchangeable lens in the camera main body, so that the inside of the camera main body has the sealed structure. As a result, dust is prevented from adhering to the surface of the image pickup element provided into the camera main body.

The diaphragm which deflects freely and the close-end cylindrical bellows or a screen made of resin or the like is provided between the mechanism portion and a casing of the camera, so that the camera mechanism portion is shielded against air and is sealed. At the same time, a mechanism that reduces the pressure difference between the inside of the camera and atmospheric air due to temperature change, altitude change and the other weather conditions is provided.

A concrete constitutional example of the digital camera 14 according to the present invention is shown in FIG. 1. FIG. 1 is a sectional view illustrating a state viewed from a rear side (photographer side) of the digital camera 14, but the same constitution as the state shown in FIG. 1 can be used in the front side (photographing lens side) of the digital camera 14. In this case, however, the image pickup element 3 shown by a broken line in FIG. 1 is naturally mounted so that an exposing surface of the image pickup element 3 faces a front side on the sheet surface of FIG. 1 (shown by a solid line)

An opening 4 is provided to a center of an inner rear surface of the body frame 1 in the camera, and the square image pickup substrate 2 mounted with the image pickup element 3 is attached to a flat surface around the opening 4. In this case, the image pickup substrate 2 is held to the flat surface by the plate springs (pressing members) 5 whose base ends are fixed to the camera main body in the pressed and fixed state. As a result, the image pickup substrate 2 is accurately located to the optically axial direction of the photographing lens, not shown, and even if an external force such as deadweight or slight impact is applied thereto, the position of the image pickup element 3 is fixed in an unmovable state.

The first racks 8 are fixed to the vicinities of the right and left ends above the image pickup substrate 2 in the up-down direction (the longitudinal direction of the image pickup substrate 2). Both the ends of the first pinion 7 extended to the right-left direction (the lateral direction of the image pickup substrate 2) are engaged with the right and left racks 8, and the right and left ends of the pinion 7 are supported by the bearings 9 on the side of the camera main body rotatively. Movement of the image pickup substrate 2 to the rotating direction is, therefore, restrained with respect to the optical axis of the photographing lens, and its position in the up-down direction in the drawing is restricted by the pinion 7. Further, the operation knob 6 for rotation is annexed to the left end of the pinion 7. When the pinion 7 is rotated by the operation knob 6, the position of the image pickup substrate 2 in the up-down direction can be suitably driven to be adjusted via the racks 8.

The second rack 12 is fixed to the vicinity of the upper end of the image pickup substrate 2 in the right-left direction (the lateral direction of the image pickup substrate 2). The second pinion 11 extended to the up-down direction is engaged with the rack 12, and the pinion 11 is supported by the bearing 13 on the side of the camera main body rotatively. Further, an operation knob 10 for rotation is annexed to the upper end of the pinion 11. When the pinion 11 is rotated by the operation knob 10, the position of the image pickup substrate 2 can be suitably driven to be adjusted via the rack 12.

At the time of photographing, therefore, when the operation knob 6 annexed to the pinion 7 and the operation knob 10 annexed to the pinion 11 are independently turned, the image pickup element 3 mounted to the image pickup substrate 2 is suitably adjusted to arbitrary positions in the right-left direction and the up-down direction with respect to the optical axis of the photographing lens. The pinion 7 and the pinion 11 can be replaced by cams, and the racks 8 and the rack 12 can be replaced by cam followers. Even in such a constitution, the position adjustment which is equivalent to the above one can be made. The lateral direction position adjusting mechanism and the longitudinal direction position adjusting mechanism of the present invention, namely, the driving mechanisms that independently move the image pickup substrate 2 to the right-left direction and the up-down direction are not limited to the rack and pinion type or cam type ones, and another types of driving mechanisms can be suitably adopted according to design.

According to the embodiment in FIG. 1, before an object such as a tower block is photographed, the image pickup substrate 2 is independently moved to the longitudinal direction and the lateral direction so as to be located so that the image photographed by the photographing lens is imaged on the image pickup element 3. For this reason, the image pickup element 3 is easily adjusted to desired positions in the longitudinal and lateral directions. The photographer, therefore, visually checks and adjusts the perspective state of the image on the electronic display, and can photograph the object, so as to be capable of getting a satisfactory picture without distortion of the photographed image.

Figure 2:
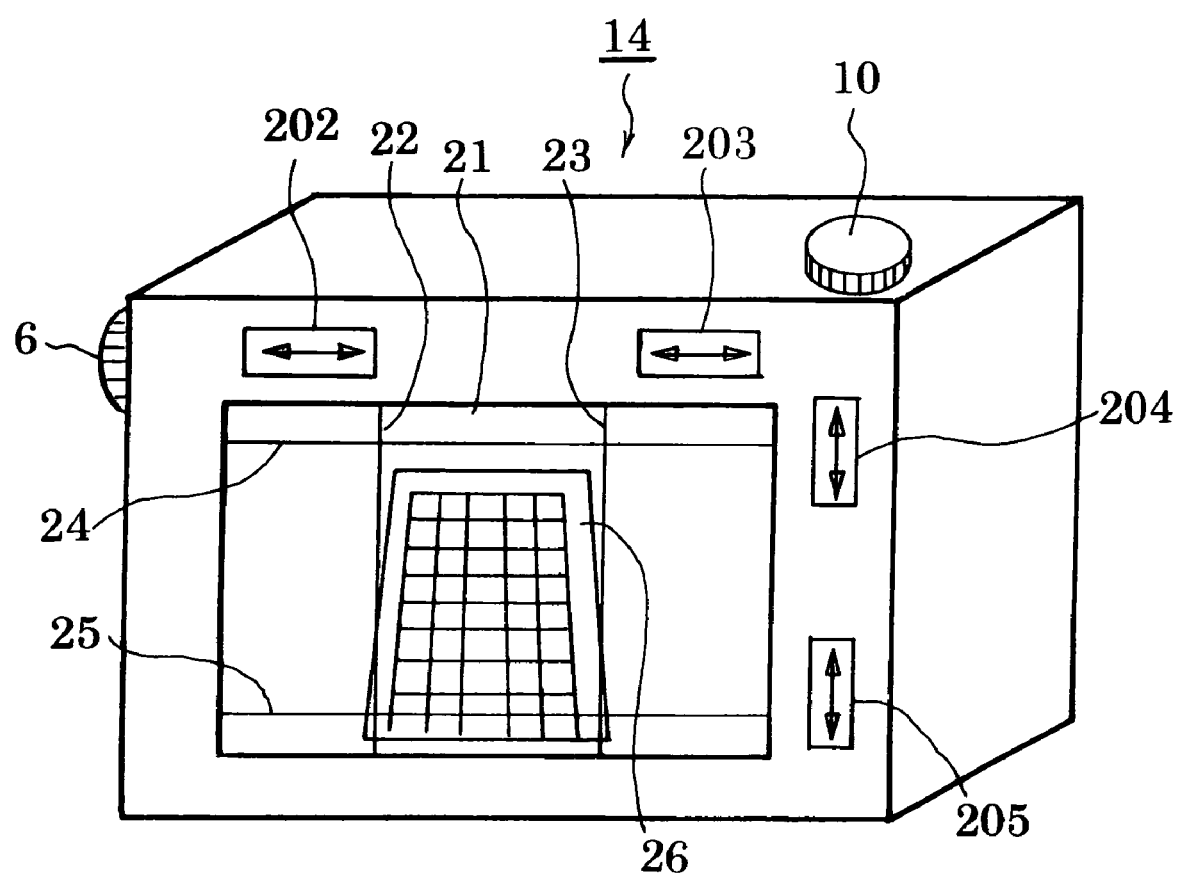
FIG. 2 is a perspective view illustrating one example of an electronic display of the digital camera according to the present invention.

FIG. 2 illustrates one example of the electronic display (finder) 21 of the digital camera 14 according to the present invention. Vertical lines 22 and 23 as the vertical direction indicator lines are displayed as software display on the electronic display 21, and lateral lines 24 and 25 as the lateral direction indicator lines are displayed as software display on the electronic display 21. As to the indicator lines 22 to 25, only the vertical lines 22 and 23 or the lateral lines 24 and 25 may be selectively displayed by using an operation switch, for example, at the time of photographing, or only one of the vertical lines 22 and 23 or one of the lateral lines 24 and 25 may be suitably displayed.

In the example of the drawing, the positions of the vertical lines 22 and 23 and the lateral lines 24 and 25 can be independently moved to be adjusted by seesaw switches (operating section for displaying vertical lines) 202 and 203 and seesaw switches (operating section for displaying lateral lines) 204 and 205. In this case, arrows or the like are marked on the surfaces of the seesaw switches 202 to 205 so as to display the moving directions of the indicator lines 22 to 25 corresponding to the switches. A form and a constitution of the operating members for adjusting the positions of the indicator lines 22 to 25, namely, switches and buttons are not particularly limited, and thus publicly-known operating units such as switches and buttons can be widely adopted as long as they can independently move the indicator lines 22 to 25 to arbitrary positions.

In the case of the example in FIG. 2, a finder image 26 of the object such as a tower block is displayed on the electronic display 21, and for example, the vertical line 22 is moved to an arbitrary position in the lateral direction on the left portion of the finder image 26 by the switch 202 so as to be capable of being matched with the left end of the finder image 26. Similarly, the vertical line 23 is moved to an arbitrary position in the vertical direction on the right portion of the finer image 26 by the switch 203 so as to be capable of being matched with the right end of the finder image 26.

For example, when the perspective in the up-down direction is adjusted, the pinion 7 is pivoted by the operation knob 6, so that the perspective in the up-down direction is adjusted to the optimal state. Actually, when the operating knob 6 is pivoted so as to move the image pickup element 3, only the finder image 26 is moved, and thus the direction of the optical axis of the camera should be changed. The vertical lines 22 and 23 are readjusted according to the adjustment state, and further may be finely adjusted by the operation knob 6. FIG. 2 illustrates a state in the middle of the perspective adjustment, and does not illustrate the complete adjusted state. In the complete perspective adjusted state, for example, an outline of the finer image 26 of the object such as tower block matches with the vertical lines 22 and 23 in parallel.

Similarly, when the perspective should be adjusted in the horizontal direction, the lateral lines 24 and 25 are matched with an upper edge and a lower edge (upper end and lower end) of the finder image 26 in the horizontal portion in the up-down direction. The operation knob 10 is operated so as to pivot the pinion 11, and while the perspective in the horizontal direction is being visually checked, it may be adjusted to the optimal state.

In this embodiment, the vertical lines 22 and 23 and the lateral lines 24 and 25 which are indicator lines are displayed as software display on the electronic display 21, but the vertical lines 22 and 23 are independently move to arbitrary positions in the lateral direction on the entire surface of the electronic display 21 by the exclusive display operating section. This is applied also to the lateral lines 24 and 25, and they are independently moved by the exclusive display operating section so that positions are adjusted. As a result, the indicator lines 22 to 25 are located with respect to the end portions of the finder image 26, and the perspective state can be visually checked and adjusted. For this reason, visual check and adjustment can be carried out quickly and accurately.

FIG. 2 illustrates the case using a conventional liquid crystal screen for convenience of the explanation. It is, however, more preferable that a ferroelectric liquid crystal micro-display (not shown) is used as the finder so that the constitution may be similar to the state explained with reference to FIG. 2 and the ferroelectric liquid crystal micro-display is magnified by a loupe. If necessary, a conventional liquid crystal screen is suitably used at the same time, thereby displaying an image.

Figure 3:
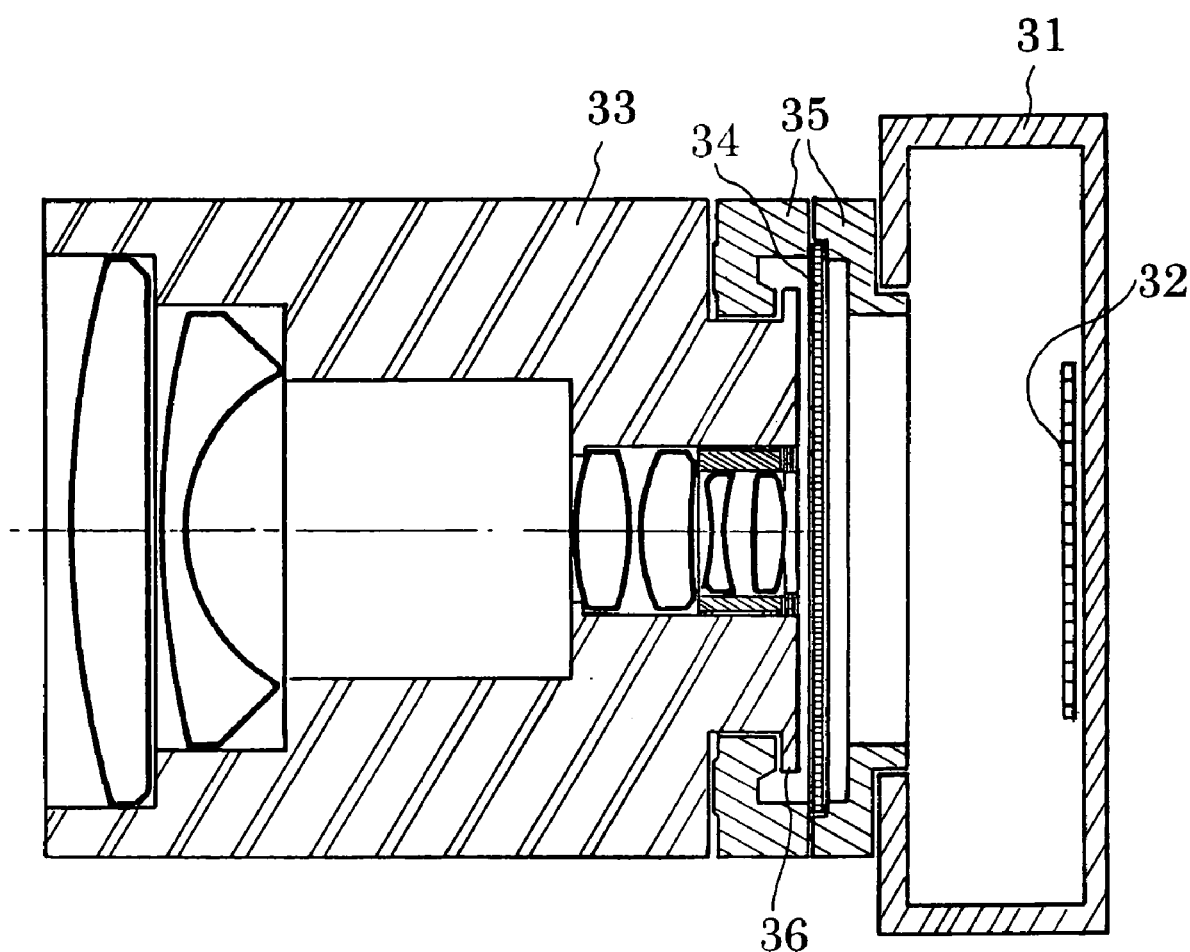
FIG. 3 is a sectional view illustrating a constitutional example in which a dustproof plate is fastened to a camera main body according to the present invention.

FIG. 3 illustrates one example of a concrete constitution according to claim 3 of the present invention. A camera main body 31 has an image pickup element 32 on its inner surface on one side (right surface or rear surface in FIG. 3) (the drawing and explanation of the finder and the other mechanisms are omitted). A mount 35 having a constitution corresponding to a mount 36 of an interchangeable lens section 33 is mounted to the inner surface on the other side of the camera main body 31 (left side or front side in FIG. 3). A dustproof plate 34 made of glass or resin is fastened to the inner side of the mount 35 so as to prevent dust or the like from entering the camera main body 31.

Figure 4:
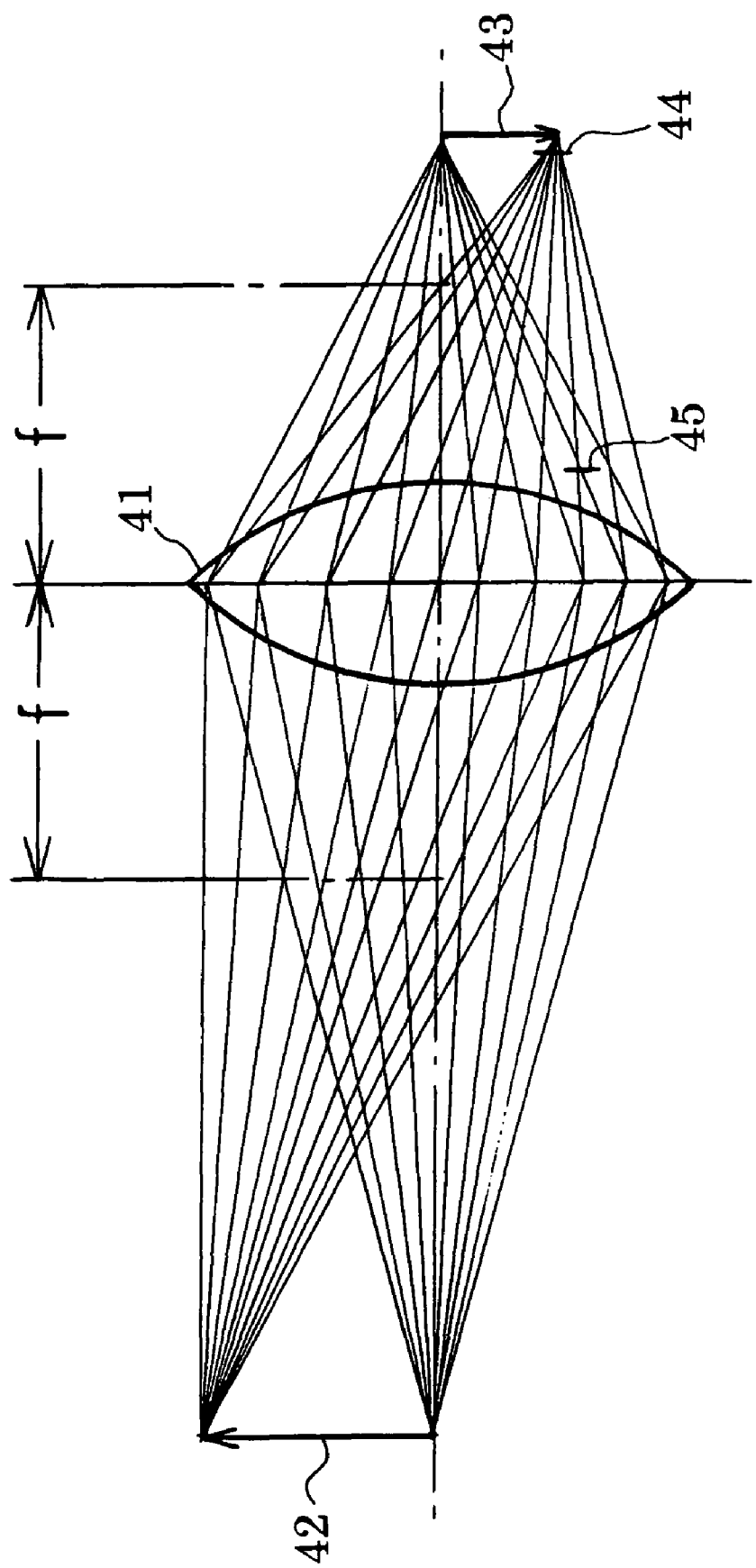
FIG. 4 is an explanatory diagram illustrating an imaged state of a projected image by means of a photographing lens according to the present invention.

An effect of the dust proof plate 34 is explained below. FIG. 4 illustrates an imaging state of a projected image by means of a photographing lens 41. As shown in FIG. 4, light beams, which are radiated from specified one point of an object and enter an entire aperture of the photographing lens 41, are condensed to specified one point in a corresponding position to be an emission side if a distance to the object is farther than a focal length f of the photographing lens 41. The light beams, which are radiated from the object 42 shown in FIG. 4 and enter the photographing lens 41, are, therefore, imaged as a projected image 43 in a specified corresponding position. When FIG. 4 illustrates the imaged state by means of the photographing lens in the camera, the image 43 in FIG. 4 is imaged on the image pickup element 32 in FIG. 3. As shown in FIG. 3, if dust 44 adheres onto the image pickup element 32 (in FIG. 4, since it cannot be drawn with it overlapping with the image 43, it is drawn in a position slightly close to the photographing lens 41), the image pickup element 32 captures the dust 44 directly as the image 43. Even a person who is not skilled in the art can understand this easily.

If dust whose size is the same as the dust 44 is now present in a position designated by reference numeral 45 in FIG. 4, only a slight part of the light beams to be imaged as the image 43 is blocked. Further, the light beam which is blocked by the dust 45 becomes a light beam in both directions towards a forward end and a base in an arrow direction of the image 43 in the drawing. That is to say, the entire image 43 is uniformly blocked, so that a specified portion of the image 43 is not blocked nor omitted. Since the light beams which enter the entire aperture of the photographing lenses 41 from a specified point of the object 42 are condensed to one point in an imaging position, the incident light and the emitted light from the specified point of the object 42 are dissipated and converged into a conical shape.

Attenuation in a light amount due to the dust 45 becomes small in inverse proportion to the square of a distance from the imaging position (position of the image pickup element 32). The dustproof plate 34 is, therefore, provided to a position shown in FIG. 3, so that a sealed structure is obtained. When the inside of the camera main body 31 is always kept in a clean state, even if the camera is used with slight dust adhering to the surface of the dustproof plate 34 (an outer surface of the camera on the side of the photographing lens 41), an adverse problem hardly arises due to the adhesion of dust.

The dustproof plate 34 is provided between the interchangeable lens section 33 and the camera main body 31 so that the camera main body 31 has the sealed structure, thereby preventing the dust from entering the camera main body 31 at the time of interchanging a lens. Dust, therefore, does not adhere to the surface of the image pickup element 32 included in the camera main body 31, and thus inappropriate photographing due to the adhesion of dust is prevented.

Further, even if the adhesion of dust and the contaminated state are terrible, the surface of the dustproof plate 34 just have to be wiped, so that the cleaning of dust is easy. The surface of the dustproof plate 34 may be hard coated for preventing scratch. It is natural the surface of the dustproof plate 34 is subject to a reflection preventing process.

Figure 5:
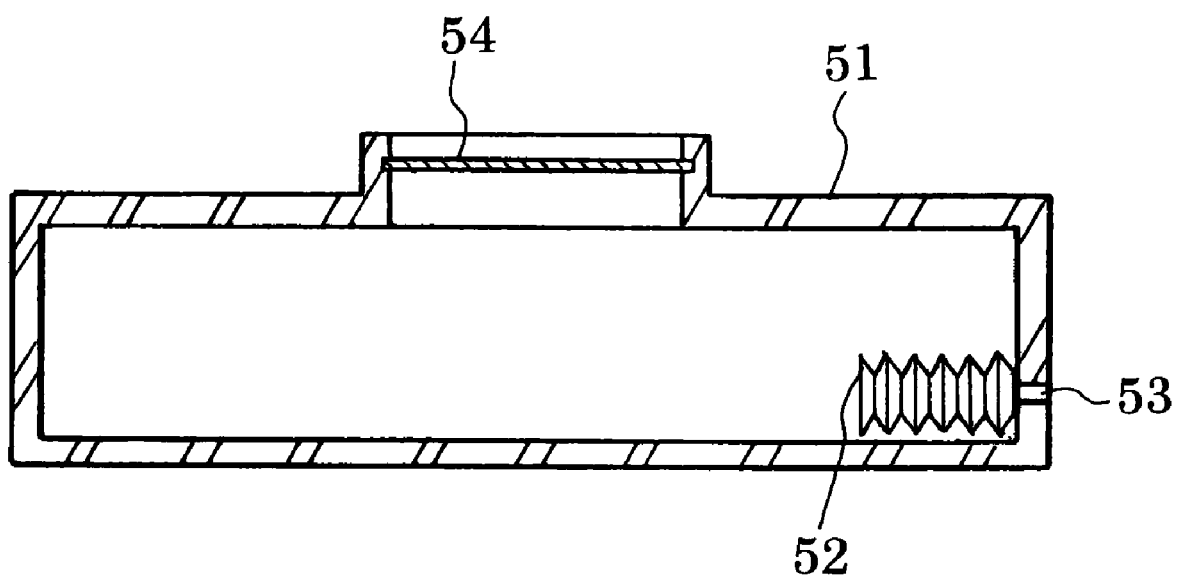
FIG. 5 is a sectional view illustrating a constitutional example where a closed-end cylindrical bellows is installed in the camera according to the present invention.
Figure 7A:
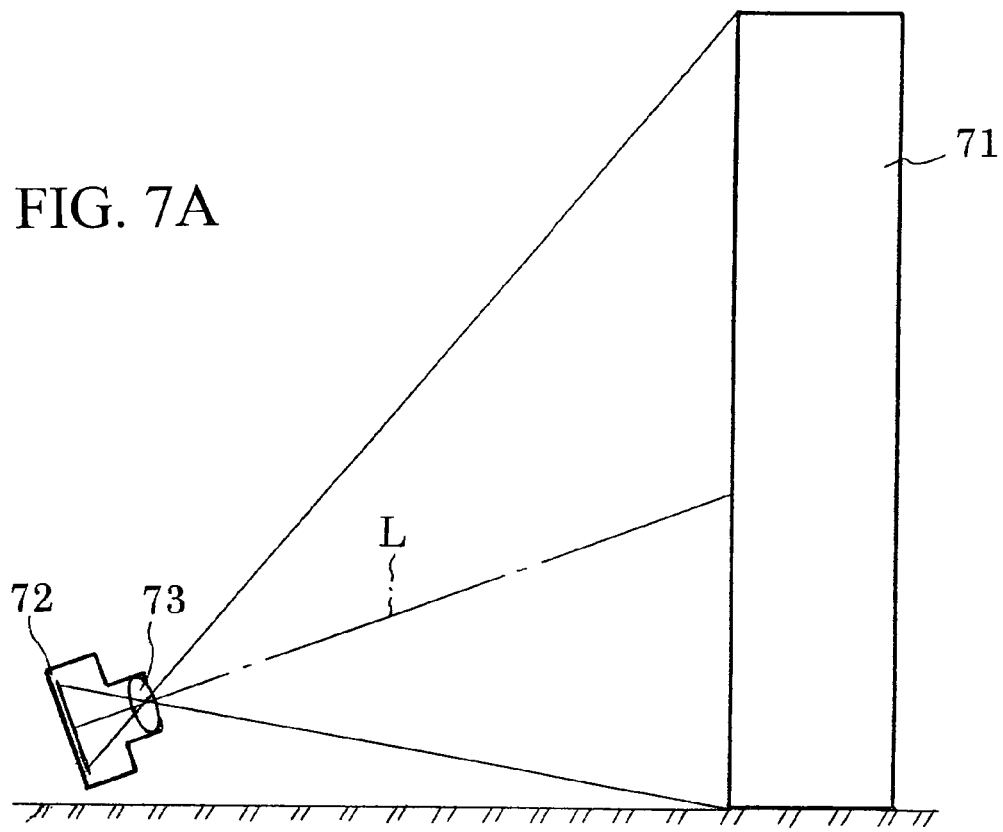
FIG. 7A is an explanatory diagram illustrating a conventional example of an image such as a high construct.
Figure 7B:
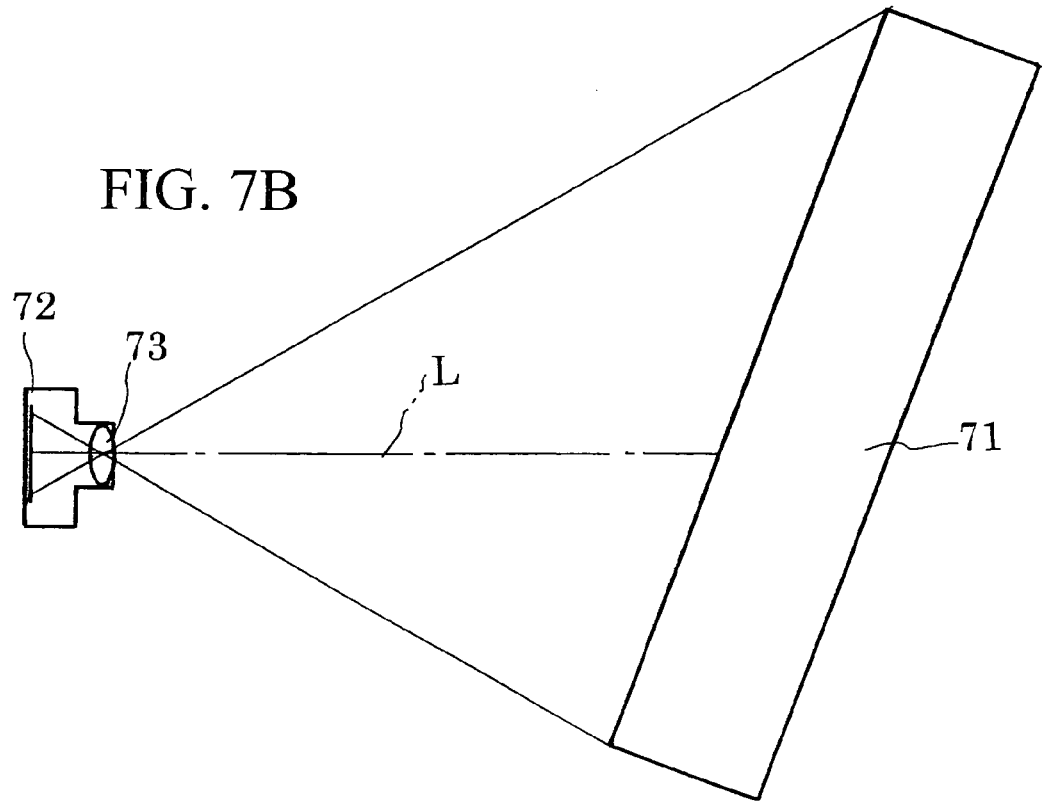
FIG. 7B is an explanatory diagram illustrating a conventional example of an image displayed with an optical axis of the photographing lens being horizontal in FIG. 7A.
Figure 8:
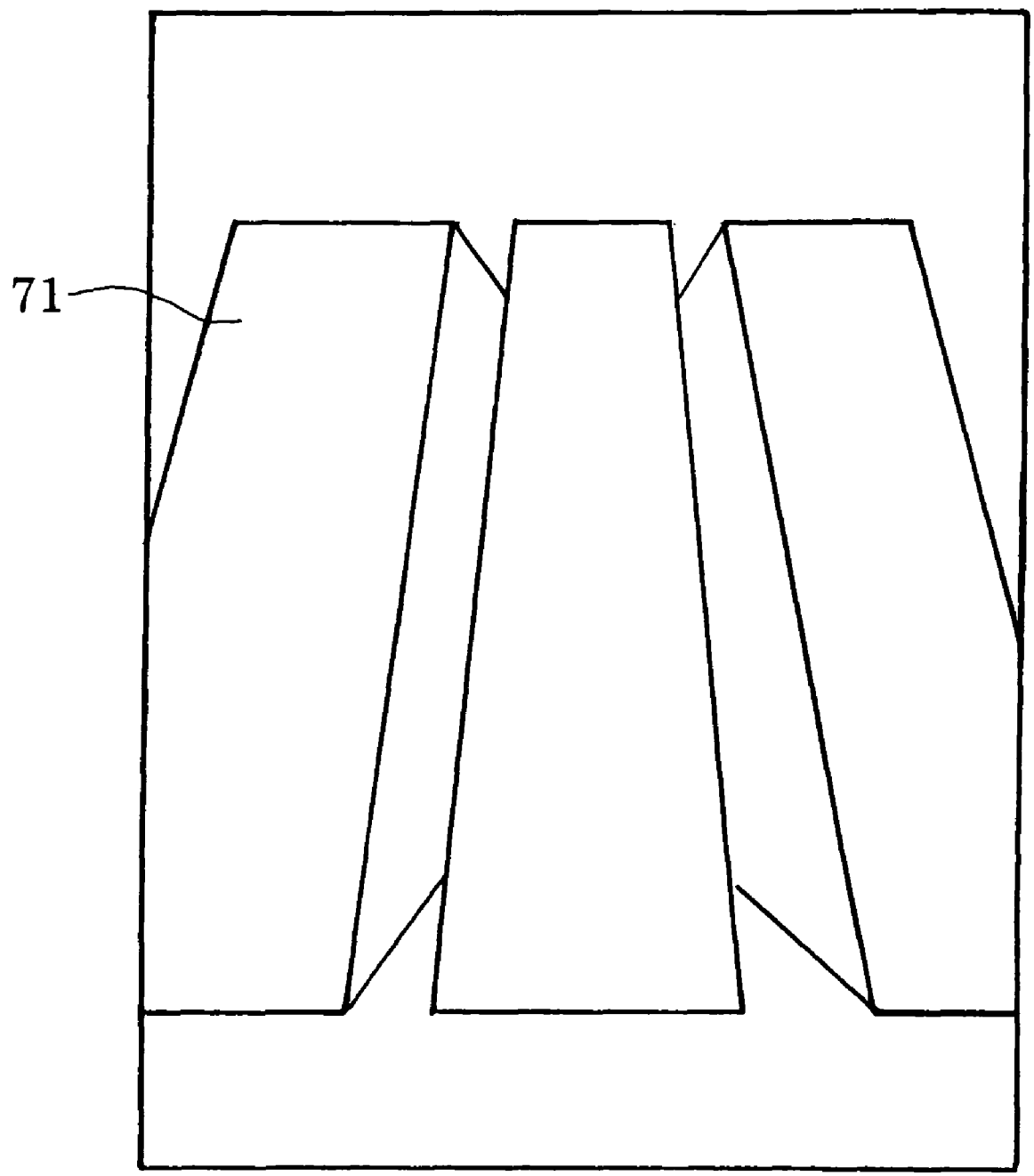
FIG. 8 is an explanatory diagram obtained by schematizing a picture photographed in the state of FIG. 7.
Figure 9:
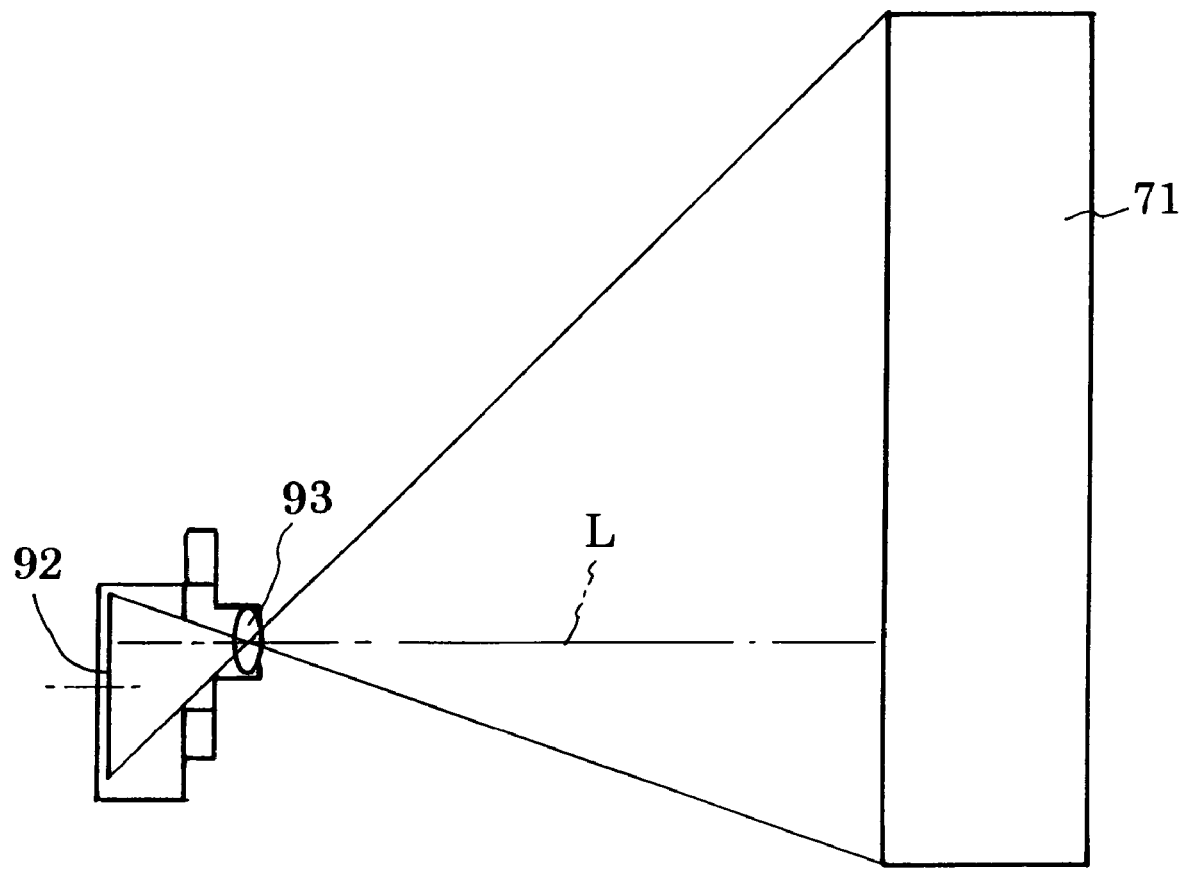
FIG. 9 is an explanatory diagram of the perspective control where a film surface is parallel with a surface of an object according to a conventional example.

FIG. 5 illustrates a constitutional example where a venthole 53 that is communicatively connected to an external section (atmospheric air) of the camera main body 51 is formed on a side wall of the camera main body 51 and the closed-end cylindrical bellows 52 which is elastic is provided to an internal portion of the camera main body 51 corresponding to the venthole 53 so that pressure of the venthole 53 is applied thereto. With such a constitution, pressure outside the camera main body 51 is applied the venthole 53, and the bellows 52 extends and contracts elastically according to a pressure difference between the inside and the outside of the camera main body 51. As a result, the pressure difference between the inside and the outside of the camera main body 51 is eliminated or is mitigated as quickly as possible by the elastic deforming function of the bellows 52. 54 designates the dustproof plate such as a glass plate.

FIG. 6 illustrates a constitutional example where a venthole 63 that is communicatively connected to the outside of a camera main body 61 is formed on one side surface of the camera main body 61 and a flexible thin plate (for example, deflectable diaphragm having a shape of a lubricator bottom shape called as engine trumpet in Japan) or a resin screen 62 is attached to the inside portion of the camera main body 61 corresponding to the venthole 53 so that pressure of the venthole 63 acts. With such a constitution, the deflectable diaphragm or the resin screen 62 mitigates the pressure difference similarly to the bellows 52 shown in FIG. 5, so that the pressure difference between the inside and the outside of the camera main body 61 is eliminated or is mitigated as quickly as possible. 64 designates the dustproof plate such as a glass plate.

According to the embodiments in FIGS. 5 and 6, when the pressure difference occurs between the inside and the outside of the camera main body 51 or 61, the flexible partitioning member 52 or 62 deflects, so that the pressure difference is mitigated or eliminated. Even in the case, therefore, where the pressure difference is wide between the inside of the camera and atmospheric air due to temperature change, altitude change and the other weather conditions, strong external force can be prevented from being applied to the dustproof plate 54 or 64.

It is noted that the present invention can be variously modified unless such modification depart from the scope of the present invention and they should be construed as being included therein.

What is claimed is:

1. A digital camera for visually checking a perspective of an image to be recorded comprising:
    a camera frame having a surface;
    an image pickup substrate pressed against the surface of said camera frame;
    an image pickup element mounted on said image pickup substrate;
    a plate spring holding said image pickup substrate against the surface of said camera frame, said plate spring permitting vertical and horizontal movement of said image pickup substrate;
    a first rack attached to said image pickup element;
    a first pinion coupled to said first rack;
    a first knob externally attached to said camera and coupled to said first pinion, whereby said image pickup substrate is moved in a vertical direction when said first knob is turned;
    a second rack attached to said image pickup element;
    a second pinion coupled to said second rack; and
    a second knob externally attached to said camera and coupled to said second pinion, whereby said image pickup substrate is moved in a horizontal direction when said second knob is turned,
    whereby the perspective of the image is capable of being visually checked and adjusted prior to taking a picture or recording the image.

2. A digital camera for visually checking a perspective of an image to be recorded as in claim 1 further comprising:
    a display capable of displaying the image to be recorded; and
    vertical and lateral lines superimposed on the display,
    whereby said vertical and lateral lines aid in visually checking the perspective of the image.

3. A digital camera for visually checking a perspective of an image to be recorded as in claim 1 further comprising:
- a fixed dust proof plate mounted between said image pickup element and a removable lens,
- whereby a sealed inner portion is formed in the digital camera.

4. A digital camera for visually checking a perspective of an image to be recorded as in claim 3 further comprising:
- a vent hole venting the sealed inner portion.

5. A digital camera for visually checking a perspective of an image to be recorded as in claim 4 further comprising:
- a flexible member placed inside said camera frame sealing said vent hole from the inner portion,
- whereby a pressure difference between the outside and the sealed inner portion is mitigated by deflection of the flexible member.

* * * * *